No. 843,827. PATENTED FEB. 12, 1907.
J. B. KNUDSEN.
COIL SPRING.
APPLICATION FILED MAY 12, 1906.
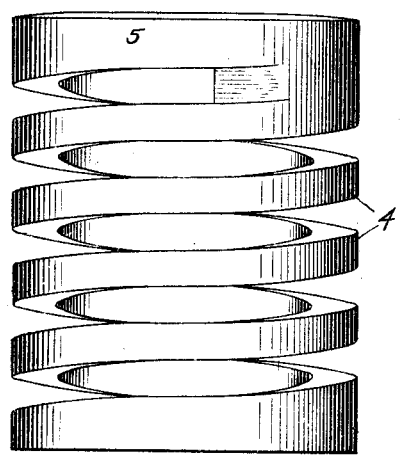
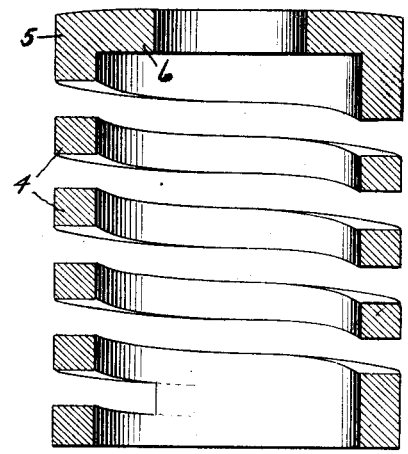
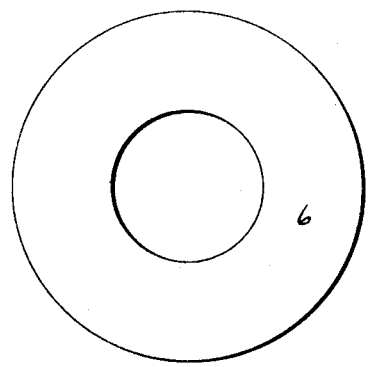
Witnesses:
Chas. T. Bassett
C. C. Clifford
Inventor
By J. B. Knudsen
O. K. Trigo
Atty

UNITED STATES PATENT OFFICE.

JACOB B. KNUDSEN, OF DALTON STATION, ILLINOIS.

COIL-SPRING.

No. 843,827.     Specification of Letters Patent.     Patented Feb. 12, 1907.

Application filed May 12, 1906. Serial No. 316,450.

*To all whom it may concern:*

Be it known that I, JACOB B. KNUDSEN, a citizen of the United States, residing at Dalton Station, in the county of Cook and State of Illinois, has invented certain new and useful Improvements in Coil-Springs, of which the following is a specification.

This invention relates to methods of forming coil-springs; and the particular object of the method which forms the subject-matter of this application is to provide a coil-spring that will not be detempered by long exposure to heat, that will possess sufficient tension or resiliency for many purposes, that can be cheaply manufactured, and that may have the ends of its outer coils merge with the adjacent coils or with a flange-ring, as shown in the drawings.

My spring is especially adapted for use in steam or hot-water valves, and when so used retains its efficiency and resiliency indefinitely, though springs made by the usual methods soon lose their resiliency when subjected to this test.

It is well known that coil-springs as commonly made lose their temper when subjected to a certain degree of heat, and hence become so impaired as to be practically useless until retempered. By my method coil-springs are produced that are without "temper," as the term is commonly used, and yet possess and retain constantly their resiliency though subjected for a long time to a high degree of either moist or dry heat. While the resilient qualities of springs made according to my method are more limited than those produced in the usual manner, they have and constantly retain sufficient "life" and resiliency to render them efficient in various positions and under a wide range of conditions.

In the accompanying drawings I have illustrated a special form of coil-spring produced by my method for the purpose of bringing out one of the advantages of such method.

In said drawings, Figure 1 shows the spring in elevation. Fig. 2 shows it in vertical section, and Fig. 3 is a top plan view.

Referring to the drawings in detail, it will be seen that the spring is made up of a plurality of coils 4, each of which is rectangular in cross-section, and that the upper coil merges with an annular ring 5, formed with an inwardly-extending flange 6, which may provide a seat or bearing for some part intended for use with the spring. If made in the ordinary way, it would be quite difficult, if not impossible, to form this wide flat ring integral with the spring-coils. The customary method of getting a similar result is to provide a separate ring and secure it to the spring. The lowermost coil of the spring shown merges with the coil above it, forming a closed spring at this end. Were this spring made from a steel bar bent to the shape shown, the free end of the bar would have to be welded to the adjacent coil, a more or less expensive operation. I do not with, however, to confine myself to the particular form of spring shown and described, since it may be made with free ends, as in ordinary springs, or otherwise, as desired, and still possess very valuable advantages not possessed by springs made by the usual methods.

My invention involves making the spring in the form desired in one operation by casting it from a suitable two-piece pattern in a mold-box with a sand core in the same manner that any other cylindrical casting would be produced. The molten metal is preferably iron or steel, or, so far as I now know, might be certain other metals having sufficient hardness. I have made springs by this casting method from iron and subjected them to severe and prolonged tests and found that they maintain their efficiency under conditions as to heat, pressure, and torsional strain that would render useless the ordinary tempered springs of commerce.

Having thus described my invention, what I claim is—

1. As a new article of manufacture, a coil-spring composed of cast metal.

2. As a new article or manufacture, a coil-spring composed of cast metal and having its respective ends integral with the next adjacent coil.

3. As a new article of manufacture, a coil-spring composed of cast metal having an annular flange formed integral with an end coil.

4. As a new article of manufacture, a coil-spring composed of cast-iron.

In testimony whereof I affix my signature in presence of two witnesses.

JACOB B. KNUDSEN.

Witnesses:
  O. K. TREGO,
  W. VON KOTHERN.